United States Patent [19]

Izukawa et al.

[11] Patent Number: 4,692,649
[45] Date of Patent: Sep. 8, 1987

[54] DRIVING CIRCUIT OF A VIBRATION WAVE MOTOR

[75] Inventors: Kazuhiro Izukawa, Yokohama; Kho Ishizuka, Kawasaki, both of Japan

[73] Assignee: Canon Kabushiki Kaisha, Tokyo, Japan

[21] Appl. No.: 832,653

[22] Filed: Feb. 25, 1986

[30] Foreign Application Priority Data

Mar. 1, 1985 [JP] Japan ................... 60-41403
Mar. 26, 1985 [JP] Japan ................... 60-62836
Mar. 26, 1985 [JP] Japan ................... 60-62837

[51] Int. Cl.$^4$ .......................................... H01L 41/08
[52] U.S. Cl. ................................... 310/316; 310/317; 310/319; 310/323; 310/366
[58] Field of Search ............... 310/316, 317, 319, 323, 310/328, 366

[56] References Cited

U.S. PATENT DOCUMENTS 4,484,099  11/1984  Kawai et al. ..................... 310/317
4,504,760  3/1985   Yamamoto et al. ............. 310/317 X
4,510,411  4/1985   Hakamata et al. .............. 310/323 X Primary Examiner—Mark O. Budd
Attorney, Agent, or Firm—Fitzpatrick, Cella, Harper & Scinto

[57] ABSTRACT

Disclosed is a driving circuit of a vibration wave motor in which a travelling vibration wave is generated in a vibratory member having a pair of driving electrostrictive element groups arranged or polarized in the fashion of a phase difference by a voltage being applied to the electrostrictive element groups, and the phase of an output signal put out by the vibration of the vibratory member being detected is shifted by a predetermined amount and the vibratory member is induced into a resonating state by the output signal being applied to the driving electrostrictive element groups and by an actuating pulse including a wide band frequency component being applied to the vibratory member particularly during the initial state thereof in which the vibratory member is not resonating.

11 Claims, 17 Drawing Figures

DRIVING CIRCUIT OF A VIBRATION WAVE MOTOR

BACKGROUND OF THE INVENTION

1. Field of the Invention

This invention relates to a driving circuit of a vibration wave motor for driving a member by a travelling surface wave.

2. Related Background Art

U.S. Pat. No. 4,510,411 disclosed a driving circuit of a vibration wave motor comprising a vibration detecting element for detecting the driving state of the vibration wave motor, i.e., whether a vibratory member is vibrating in a resonating state, whereby the oscillation frequency of an oscillation circuit is automatically varied in conformity with the signal from said element and which is further provided with a band-pass filter so that only an output of a desired frequency is applied to a driving electrostrictive element.

However, this has led to a disadvantage that actuation of such circuit cannot be automatically accomplished.

SUMMARY OF THE INVENTION

The present invention has been made in view of the above-noted disadvantages peculiar to the prior art, and a first object thereof is to bring the phase of a frequency input applied to driving electrostrictive elements at the resonance frequency of a vibration wave motor and the phase of a frequency output put out from a detecting element into a predetermined phase relation and maintain the resonating state of the vibration wave motor. Under such an object, the present invention is characterized by the provision of phase shifting means for bringing the phase of the frequency input and the phase of the frequency output put out from detecitng means for detecting the vibration of a vibratory member into a predetermined phase relation so that the phase of said frequency input and the phase of said frequency output maintain a resonating state.

A second object of the present invention is to provide a driving circuit which automatically generates a resonance frequency even in the initial state. Under such an object, the present invention is characterized by the provision of a pulse generating circuit for applying an actuating pulse having a wide-band-frequency component to the vibratory member.

Other objects of the present invention will become apparent from the following detailed description of some embodiments thereof taken in conjunction with the accompanying drawings.

DESCRIPTION OF THE PREFERRED EMBODIMENTS

Before some embodiments of the driving circuit of the vibration wave motor of the present invention are described, the vibration wave motor according to the present invention will hereinafter be described.

Figure 1A:
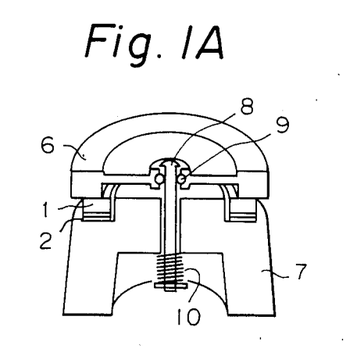
FIG. 1A is a cross-sectional view of a vibration wave motor.
Figure 1B:
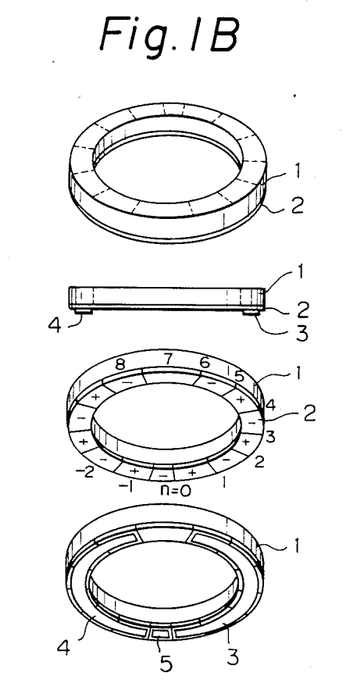
FIG. 1B illustrates the stator of the vibration wave motor shown in FIG. 1A, the stator comprising a vibratory member 1 and an electrostrictive element 2.
Figure 1C:
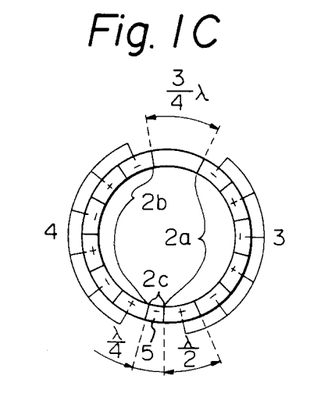
FIG. 1C is a plan view showing the polarization pattern and wiring of the electrostrictive element.

FIGS. 1A–1C illustrate the structure of the vibration wave motor. FIG. 1A is a cross-sectional view of the vibration wave motor, FIG. 1B includes a view of a stator as seen from obliquely above, the stator comprising a vibration member 1 and an electrostrictive element 2 constituting the vibration wave motor shown in FIG. 1A, a view of the stator as seen from sideways, a view showing the polarization pattern of the electrostrictive element as seen from obliquely below, and a view showing the pattern of electrodes, these four views being vertically arranged for better understanding. FIG. 1C is a plan view showing the polarization pattern of the electrostrictive element and the wiring of such electrostrictive element.

Figure 1D:
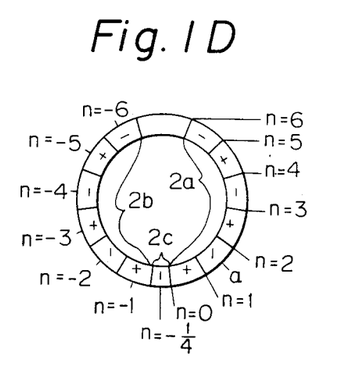
FIG. 1D illustrates for explaining the optimum phase shift characteristic of the phase shifter used in an embodiment according to the present invention.

In FIGS. 1A–1C, the vibration member 1 comprises a resilient member formed, for example, of brass. The electrostrictive element 2 is, for example, PZT (lead zircon titanate) and is joined to the vibration member 1. Such electrostrictive element is comprised of a ring-like electrostrictive element polarization-processed with a pattern as shown in the plan view of FIG. 1C, or a plurality of electrostrictive elements arranged in the form of a ring. The polarization pattern of the electrostrictive element 2, as shown in FIGS. 1B and 1C, is divided into a group 2a to which a periodic voltage is applied by an electode 3, a group 2b to which a periodic voltage is applied by an electrode 4, and a vibration detecting group 2c, and the group 2b is disposed at a pitch shifted by ¼ of the wavelength λ of the vibration wave to be excited for the group 2a. The electrostrictive elements in each group are disposed so that the polarities of the elements adjacent at the pitch of ¼λ are opposite to each other. Marks + and − shown in FIGS. 1B and 1C are signs indicative of the directions of polarization processing, and the elements are polarized so that the electrode side is minus and the vibration member side is plus. FIG. 1D is a view showing the correspondence between the polarization position and sign of the electrostrictive elements to illustrate the principle of the driving of teh vibration wave motor, and the details thereof will be described later.

Reference numeral 6 designates a moving member frictionally contacting the vibration member 1, reference numeral 7 denotes the fixed member of the motor, reference numeral 8 designates a central shaft for supporting the moving member, and reference numeral 9 denotes a bearing provided in the portion of contact between the central shaft 8 and the moving member. Reference numeral 10 designates a bearing provided so as to exert a force downwardly on the central shaft 8 as viewed in FIG. 1 to thereby cause the moving member 6 and the vibration member 1 to contact each other with a predetermined force.

In the vibration wave motor constructed as described above, periodic voltages which are shifted by 90° in phase with each other are applied to the electrostrictive element groups 2a and 2b through the electrodes 3 and 4, whereby a travelling surface wave is generated in the vibration member, and the moving member brought into frictional contact with the vibration member by such travelling surface wave is driven.

Also, where the frequencies of said periodic voltages are resonance frequencies, the motor is most efficiently driven as the vibration wave motor.

Figure 2:
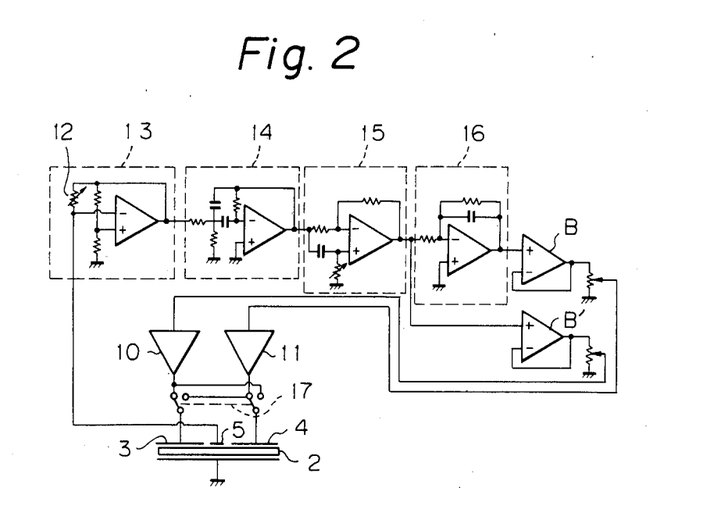
FIG. 2 is a diagram of a driving circuit according to a first embodiment of the present invention.

Reference is now had to FIG. 2 to describe a first embodiment of the driving circuit of the present invention for driving the vibration wave motor of FIGS. 1A-1C.

In FIG. 2, reference numerals 3, 4 and 5 designate the electrodes shown in FIGS. 1B and 1C, and these electrodes are disposed at the position of the electrostrictive element 1 shown in FIGS. 1B and 1C.

Reference numerals 10 and 11 denote amplifiers for amplifying an input voltage to a voltage sufficient to excite the electrostrictive element 2 and the vibration member 1, and reference numeral 13 designates a Meecham circuit. A variable resistor 12 in the Meecham circuit is for finely adjusting the resonance frequency. Reference numeral 14 denotes a band-pass filter for passing therethrough only an output of the resonance frequency necessary for the driving, of the output of the Meecham circuit, reference numeral 15 designates a phase shifter for adjusting the phases of the output current of the Meecham circuit and the counter electromotive current to a predetermined relation, and reference numeral 16 denotes a 90° phase-shifter. Letter β designates an output buffer connected to the 90° phase-shifter 16, and letter β' denotes an output buffer connected to the phase-shifter 15. Reference numeral 17 designates a change-over switch for reversing the phase relation between the frequency voltages applied to the electrodes 3 and 4 and thereby reversing the direction of revolution of the motor.

Operation of the driving circuit constructed as described above will now be described.

In this driving circuit, the Meecham circuit 13 produces a frequency voltage of a frequency for which the impedance of the vibration detecting electrostrictive element in which the electrode 5 is provided is extremely small, that is, the resonance frequency of the stator including the vibration member 1 and the electrostrictive element 2.

Now, the stator including the vibration member 1 and the electrostrictive element 2 generally has a plurality of resonance vibration modes and has a plurality of resonance frequencies correspondingly to such plurality of resonance vibration modes and therefore, the output of the Meecham circuit is not always of the frequency of the most efficient one of said resonance vibration modes, but may sometimes be of the frequency of another vibration mode. The band-pass filter 14 is provided to prevent such a phenomenon, and the frequency of the output of the Meecham circuit is a resonance frequency corresponding to the most efficient resonance vibration mode.

Subsequently, the phase of the output of the band-pass filter 14 is shifted by a predetermined angle by the phase-shifter 15. The phase of the vibration excited in the vibration detecting electrostrictive element 2c does not always coincide with the phase of the vibration produced by frequency voltages being applied to the electrostrictive element groups 2a and 2b. That is, after a time lag required until the vibration excited by the frequency voltage applied to the electrostrictive element groups 2a and 2b is propagated to the vibration detecting electrostrictive element 2c, said vibration propagates to said element 2c and therefore, where such time lag is not integer times as long as the period of said vibration, said phases do not coincide with each other and the oscillation of an oscillator does not continue stably, whereas by the phase shifter 15 of the present embodiment, the aforementioned phases are brought into a predetermined relation, whereby the oscillation always continues stably.

Also, the output of the phase-shifter 15 is applied to the electrode 4 through the 90° phase shifter 16, the amplifier 11 and the switch 17 and is applied to the electrode 3 not through the 90° phase-shifter 16 but through the amplifier 10 and the switch 17, whereby a travelling surface wave is excited in the electrostrictive element 2 and the vibration member 1 shown in FIGS. 1A and 1B and thus, the moving member 6 moves, and as previously described, in the present embodiment, the phase shifter 15 is provided and always a frequency voltage of the most efficient resonance frequency can be applied to the electrostrictive element.

Reference is now had to FIG. 1D to describe the optimum phase shift characteristic of the phase shifter 15 in the above-described embodiment.

Description will first be made of a travelling vibration wave excited when periodic voltages which are 90° out of phase with each other are applied to the electrostrictive element groups 2a and 2b.

The distribution of the polarization P of the electrostrictive element 2, when approximated by an triangular relation, is as shown in equation (1) below.

$$\left. \begin{array}{l} P_3 = p_0 \sin n\pi \quad (n \geq 0) \\ P_4 = p_0 \sin (n\pi - \pi/2) \, (n < -1/2), \end{array} \right\} \quad (1)$$

where n is a variable representative of the position and promises and shown in FIG. 1D. For example, point a is n=1.5. The suffixes of P are the numbers of the electrodes to which an exciting voltage is applied. $P_0$ is the intensity of polarization.

The voltages applied to the two electrostrictive element groups are expressed as shown in equation (2) below, where the suffixed of V are the numbers of the electrodes shown in FIG. 1B.

$$\left. \begin{array}{l} V_3 = V_0 \sin \omega t \\ V_4 = V_0 \sin (\omega t + \pi/2) \end{array} \right\} \quad (2)$$

Assuming that in the resonance state, there is a time lag of π/2 in the response to the voltage applied to the electrostrictive element, the amount of vertical displacement Z is given by equation (3) below (when there is a time lag of $\pi/2$, the applied electrical energy is all converted into mechanical energy).

$$Z = P_0 \sin n\pi \times V_0 \sin (\omega t - \pi/2) + \quad (3)$$
$$P_0 \sin (n\pi - \pi/2) \times V_0 \sin \omega t$$
$$= P_0 V_0 \sin \{(n + 1)\pi + \omega t\}$$

Thus, it will be seen that the amount of displacement Z is a function of time.

The amount of vertical displacement Z in the detecting electrode 5 shown in FIG. 1C is obtained by substituting $n = -\frac{1}{4}$ (the position of the detecting electrode 5 is $n = -\frac{1}{4}$ as is apparent in FIG. 1B) into equation (3).

$$Z = P_0 V_0 \sin \{\tfrac{3}{4}\pi + \omega t\}$$

As previously described, the response of the amount of displacement to the electrostrictive element has a delay of $\pi/2$ in the resonance state, but the delay of the response of the counter electromotive voltage occurring to the amount of displacement of the detecting electrostrictive element may be regarded as null when the resistance value of the resistor 12 is great relative to the impedance (during the resonation) of the electrostrictive element 5. That is, by the polarization of the electrostrictive element of the detecting electrode, the amount of vertical displacement Z and the phase of the electromotive voltage $V_5$ coincide with each other. Accordingly, the counter electromotive voltage $V_5$ of the electrostrictive element produced in the detecting electrode is as follows:

$$V_5 = V_{0'} \sin (\tfrac{3}{4}\pi + \omega t)$$
$$= V_{0'} \sin (\omega t + 135°).$$

where $V_{0'}$ is a constant.

When the resistance value of the resistor 12 is small as compared with the impedance of the electrostrictive element 5, the voltage of the input terminal of an operational amplifier further advances by 90°.

Accordingly, the phase-shifter 15 may be a phase shifter which puts out an output with a phase delay of 135° of the input when the resistance value of the resistor 12 is great as compared with the impedance (during the resonation) of the electrostrictive element, and may be a phase shifter which puts out an output with a phase delay of 225° of the input when the resistance value of the resistor 12 is small.

In the foregoing description, the advance or delay of the phase occurring in the Meecham circuit, the bandpass filter, the amplifiers, etc. has been neglected, but in the actual circuit, the phase shift characteristic of the phase shifter 15 may be determined with the advance or delay of the phase occurring in such circuit being also taken into account.

Figure 3:
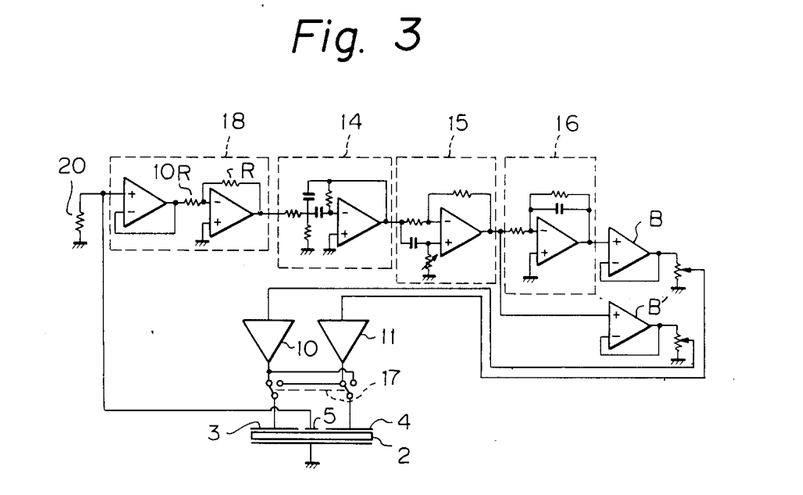
FIG. 3 is a diagram of a driving circuit according to a second embodiment of the present invention.

Reference is now had to FIG. 3 to describe a second embodiment of the driving circuit of the present invention.

In FIG. 3, elements functionally similar to those in FIG. 2 need not be described. In FIG. 3 reference numeral 18 designates an amplifying circuit for amplifying the voltage produced in the vibration detecting electrode 5. In the embodiment shown in FIG. 2, a Meecham circuit has been used to construct the driving circuit, but in the second embodiment, a so-called vibration feedback type driving circuit is described.

Again in the present embodiment, as in the embodiment shown in FIG. 2, the phase-shifter 15 is provided so that the phase of the input terminal of the driving circuit and the phase of the output terminal of the driving circuit satisfy a predetermined relation. The predetermined relation is a relation between the phases which, as in the embodiment shown in FIG. 2, compensates for the time until the vibrations of the electrostrictive groups 2a and 2b driven by the output of the driving circuit are propagated to the vibration detecting electrostrictive element 2c.

In the above-described construction, the shift of phase caused before a resonance frequency voltage (current) input to the amplifier 18 arrives at one output terminal (electrode 3) of the driving circuit can be compensated for by the amount of phase shift of the phase shifter 15 being adjusted. That is, when the input impedance of the signal from the vibration detecting electrostrictive element (the resistance value of a resistor 20 in FIG. 3) is sufficiently high (i.e., during the voltage detection), a phase delay of 135° is created. Conversely, when the input impedance is low (i.e., during the current detection), a phase delay of 225° is created. That is, where the periodic voltage applied to the electrode 3 is expressed as $V_0 \sin \omega t$ as in the embodiment shown in FIG. 2, the input voltage from the electrode 5 to the amplifier is $V_0 \sin (\omega t + 135°)$ when the resistance value of the resistor 12 is greater than the impedance of the electrostrictive element 5, and the input current is $I_0 \sin (\omega t + 225°)$ when the resistance value of the resistor 12 is smaller than the impedance of the electrostrictive element 5.

The present embodiment, as compared with the embodiment of FIG. 2, is simple in construction because the resonance frequency adjusting resistor 12 is eliminated, and as compared with the conventional vibration feedback type oscillator, is improved in the resonance frequency follow-up property and the output which can be taken out relative to the excited voltage because the phase compensation is effected. Again in the present embodiment, as in the embodiment shown in FIG. 2, the advance or delay of the phase occurring in the bandpass filter, the amplifier, etc. is neglected, but in the actual circuit, the phase shift characteristic of the phase-shifter 15 may be determined with such advance or delay of the phase being taken into account.

In the present embodiment, as described above, the phase-shifter 15 is provided in the driving circuit of the vibration wave motor to thereby eliminate the disadvantages peculiar to the prior art, and reference is now had to FIGS. 4 and 5 to describe to what extent the phase may be shifted by the phase shifter 15 in conformity with the position at which the vibration detecting electrostrictive element is provided.

Figure 4A:
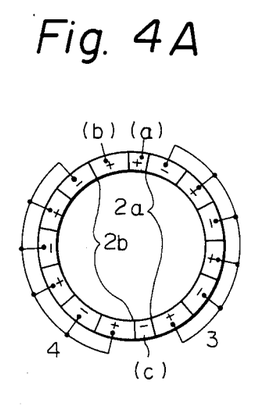
FIGS. 4A–4D show the disposition of vibration detecting electrostrictive elements.
Figure 4B:
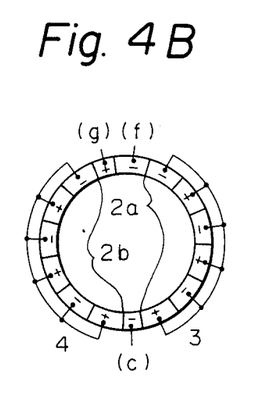
Figure 4C:
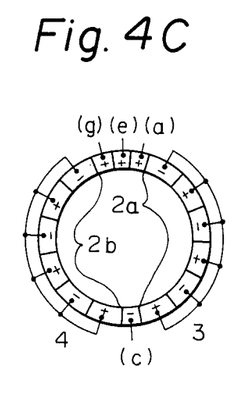
Figure 4D:
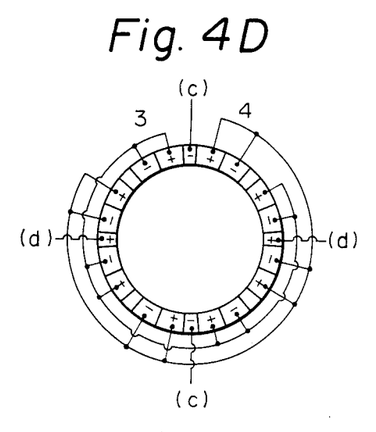

FIGS. 4A–4D are plan views showing some examples of the disposition of the vibration detecting electrostrictive element. In FIGS. 4A–4C, the electrostrictive element groups 2a and 2b are disposed just in the same manner as the embodiment shown in FIG. 1C, and examples of the disposition of the vibration detecting electrostrictive element are shown as (a), (b), (c), (e), (f) and (g). Also, in FIG. 4D, an example of the disposition of the vibration detecting electrostrictive element in a case where the electrostrictive element groups 2a and 2b are disposed in a pattern different from the embodiment shown in FIG. 1C is shown as (c) and (d). In FIGS. 4A-4D, the (c) showing the disposition of the electrostrictive element is used in common, and any (c) shown in FIGS. 4A-4D is vibration in the same phase and therefore is indicated by a common sign.

Figure 5A:
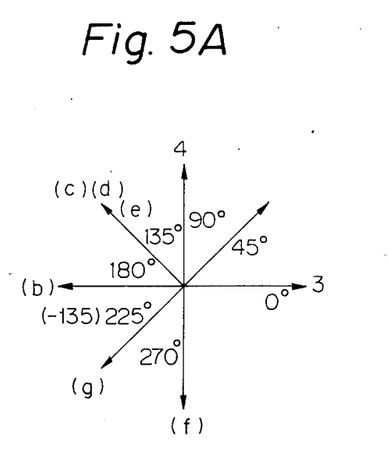
FIGS. 5A and 5B show the relations between the phases of electromotive voltages produced in the vibration detecting electrostrictive elements shown in FIGS. 4A–4D and the phases of voltages applied to electrodes 3 and 4.
Figure 5B:
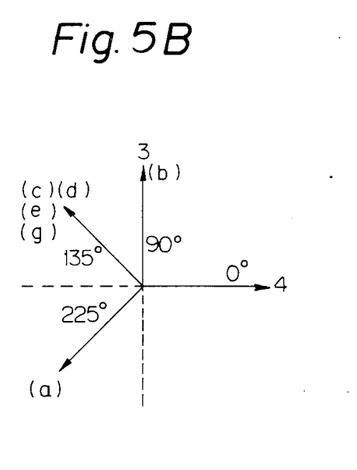

FIGS. 5A and 5B show the result of a calculation effected in the same manner as the aforedescribed method as to in what relation the phases of the electromotive voltages produced in the vibration detecting electrostrictive elements disposed at the locations indicated by (a)-(g) in FIG. 4 are with the phases of the periodic voltages applied to the electrodes 3 and 4. In FIGS. 5A and 5B, there are shown cases where the resistance values of the load resistances of the vibration detecting electrostrictive elements are great as compared with the impedance of the electrostrictive element. FIG. 5A shows a case where the periodic voltage applied to the electrode 4 is more advanced by 90° in phase than the periodic voltage applied to the electrode 3, and FIG. 5B shows a case where the periodic voltage applied to the electrode 3 is more advanced by 90° in phase than the periodic voltage applied to the electrode 4.

That is, in FIGS. 5A and 5B, when travelling waves are generated in the stator comprising the vibratory member 1 and the electrostrictive element 2, the directions of travel of the travelling waves are opposite to each other. That is, in FIGS. 5A and 5B, the directions of revolution of the motor are opposite to each other. In FIGS. 5A and 5B, the counter-clockwise direction represents the advance of the phase. As can be seen from the comparison between FIGS. 5A and 5B, if the vibration detecting electrostrictive element is disposed at the location indicated by (c) or (d) (e), the phase of an electromotive voltage produced in this element will not change even if the periodic voltages applied to the electrodes 3 and 4 are changed over to change the direction of revolution of the motor. Accordingly, the amount of phase shift of the phase-shifter 15 need not be changed over when the direction of revolution of the motor has been changed by the vibration detecting electrostrictive element being disposed at the location indicated by (c) or (d) (e).

In contrast, where vibration detecting electrostrictive elements are disposed at the other locations (a), (b), (f) and (g) than the locations (c), (d) and (e) indicated in FIG. 4, it is necessary to change over the amount of phase shift of the phase-shifter 15 each time the direction of revolution of the motor is changed.

The phases of these electromotive voltages are in a no-load state (an infinite load resistance) and, if the load resistance is made small, the detector provides a current source as shown also in the above-described embodiment, and thus, the phase is detected as an electromotive current. The phase in this case is more advanced by 90° than the phase of the electromotive voltage.

In the first embodiment, once the oscillation frequency has coincided with the resonance frequency, even if the resonance frequency of the vibratory member is varied by external conditions such as a variation in the load applied to the vibratory member and a variation in temperature, the oscillation frequency of the driving circuit of the vibration member varies following said variations and the vibration member is driven always in the best condition, whereas in this embodiment, when in the initial state, said oscillation frequency is not within the band of the resonance frequency of the vibration member, the vibration member cannot be driven at an optimum resonance frequency.

Description will now be made of a second embodiment in which a pulse voltage of a wide band frequency component including a plurality of resonance frequencies is input to the vibration member and the vibration member is vibrated at the resonance frequency thereof.

Figure 6:
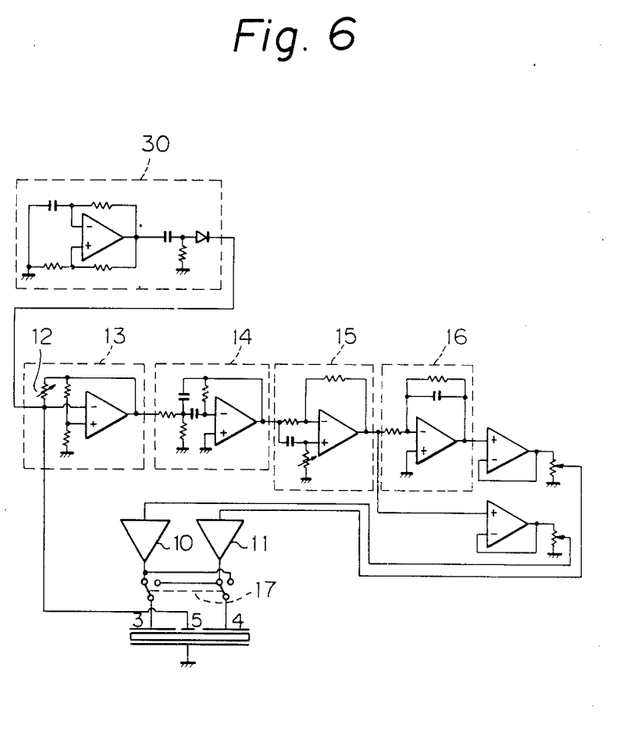
FIG. 6 is a diagram of a driving circuit according to a third embodiment of the present invention.

FIG. 6 shows the second embodiment. This embodimemt is entirely the same as the embodimemt of FIG. 2 with the exception that it includes an actuating pulse generating circuit 30 generating a pulse having a wide band frequency component.

Description will hereinafter be made of a case where the output of resonance frequency is not produced in the Meecham circuit 13. When the main switch is closed, this circuit oscillates at a frequency determined by the constant of the Meecham circuit and the impedance of the piezoelectric or electrostrictive element, but usually at this stage, said frequency is not a resonance frequency. Accordingly, as previously described, the volume 12 has heretofore been turned to adjust the frequency to the resonance frequency, but in the present embodiment, there comes a moment when the resonance frequency is momentarily applied with the application of a pulse voltage including a wide band frequency component put out from the actuating pulse generating circuit and the stator is intensely excited. At this time, a powerful counter electromotive voltage is produced at the detecting terminal 5 and this is again applied to the Meecham circuit in a suitable phase relation processed by the phase-shifter 15 and thus, positive feedback is applied, whereafter the amplitude becomes greater and at last, the resonance frequency in which the amplitude is greatest is maintained.

Where the pulse voltage put out from the actuating pulse generating circuit 30 at this time is a low voltage, even if this pulse voltage continues to be applied, the Meecham circuit 13 is not influenced once the output thereof has assumed the resonance frequency and therefore, the low pulse voltage may normally continue to be applied.

Figure 7:
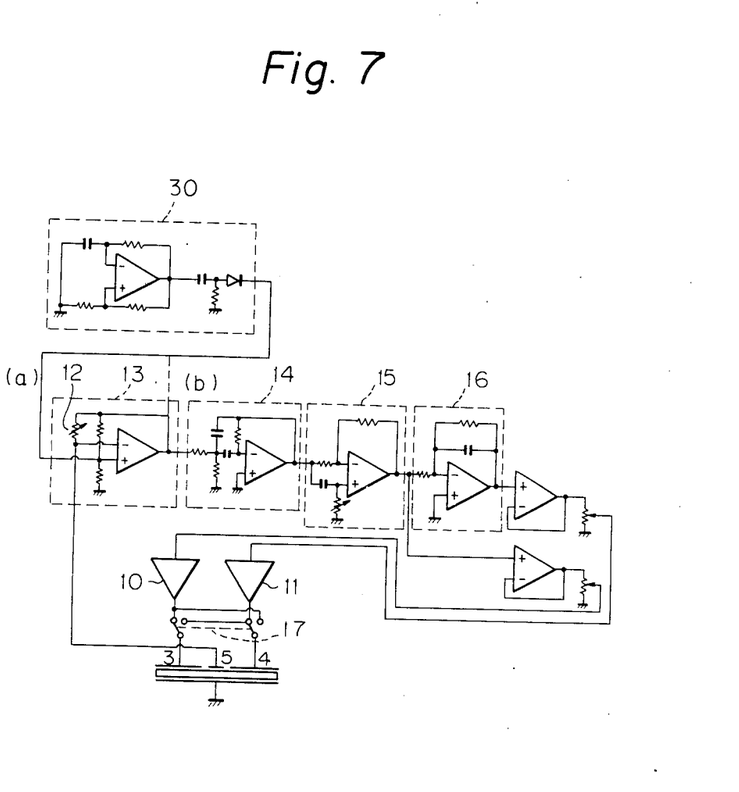
FIG. 7 is a diagram of a driving circuit according to a fourth embodiment of the present invention.

In the present embodiment, a pulse vibration voltage is applied to the impedance detecting terminal of the Meecham circuit 13 (the inverting input terminal of the operational amplifier constituting the Meecham circuit 13), but a similar effect can be expected also at other locations. Although these locations are indicated at (a) and (b) in FIG. 7, these locations are not restrictive, but the pulse vibration voltage may also be applied directly to the electrostrictive element for dirving the vibration member, and the gist of the present invention resides in applying a pulse having a high band frequency component to the vibration member.

The present invention can also be applied to the actuation of a vibration feedback type driving circuit which does not have an internal oscillator such as a Meecham circuit, thereby obtaining the effect of enhancing the reliability of actuation and the re-actuatability during the stoppage of oscillation.

In the above-described embodiments, a pulse including a wide band frequency component is generated in the actuating pulse generating circuit and such pulse is of a square wave form, but it may also be a pulse of other shape.

Also, in the above-described embodiments, an electrostrictive element has been shown as the electromechanical energy converting element, but of course, a piezoelectric element may also be used as such converting element. Also, a revolution type motor has been shown as the vibration wave motor, but a linear type motor may also be used, and any motor of other shape which is used with a vibration member being resonated is also applicable.

According to the present invention, as described above, provison is made of detecting means for detecting the vibration of the vibration member and putting out a signal corresponding to the vibration, oscillating means responsive to the signal of said detecting means to apply a periodic voltage of a resonance frequency to the electro-mechanical converting element which is the drive force source of the vibration wave motor, and phase means for adjusting the phase of the signal of said detecting means to the phase of said periodic voltage so that the driving of the vibration wave motor is efficiently accomplished, and therefore, the driving of the vibration wave motor can always be accomplished well. Also, the adjustment of the resonance frequency immediately after the closing of the main switch is automatized and further, the ideal driving of the vibration wave motor provided with the resonance frequency follow-up property becomes possible. Also, according to the present invention, the driving circuit can be constructed simply by adding a pulse generating circuit, and the effect of not losing compactness and light weight which are the features of the present motor is achieved substantially without adjustment.

The detecting electrodes (b) and (f) in FIG. 5 will now be examined. The electrode (b) is at a position of the same phase as the electrode 4 and the direction of polarization thereof is plus and, even if the direction of revolution is changed, the phase put out from the detecting electrode (b) is always more advanced by 90° than the phase applied to the electrode 4. The electrode (f) is at a position of the same phase as the electrode 3 and the direction of polarization thereof is minus, and it will be seen that even if the direction of revolution is changed, the phase put out from the detecting electrode (f) is always more delayed by 90° than the phase applied to the electrode 3.

Figure 8:
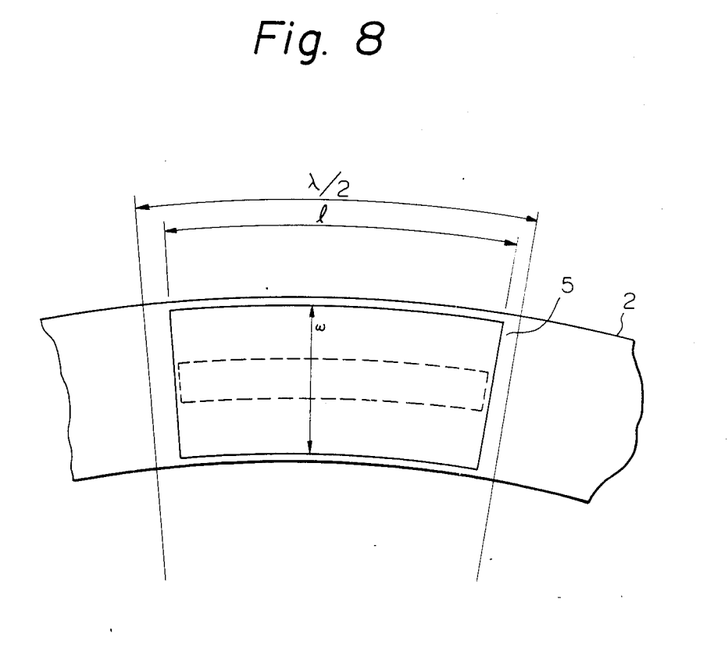
FIG. 8 shows the size of a vibration detecting electrode.

The size of the vibration detecting electrode 5 will now be described with reference to FIG. 8. FIG. 8 is an enlarged view showing the vicinity of the vibration detecting electrode 5. In FIG. 8, $\lambda/2$ indicates one half of the wavelength of the bent travelling vibration wave on the vibration wave motor body 10. l indicates the circumferentical length of the vibration detecting electrode 5, and $\omega$ indicates the width of the vibration detecting electrode 5. The dot-and-dash line indicates the center line showing the same positional phase as that of the driving electrode 5.

It is desired that the length l be $l < \lambda/2$ about the center line. If l is greater than $\lambda/2$, it will be useless because the piezoelectric effect or the like is negated in the vibration detecting electrode 5. The width $\omega$ need not particularly have the center thereof determined. However, it is desired that the vibration detecting electrode 5 be of a shape which will not detect other unnecessary vibrations. For example, if the vibration detecting electrode 5 is provided only in the central portion of the electrostrictive element 2 as indicated by dotted line in FIG. 8, there will be an effect that it is less influenced by the unnecessary vibration of the electrostrictive element 2 (the circumferential distortional vibration of the electrostrictive element 2. Also, a greater area of the vibration detecting electrode 5 would result in a lower impedance Z and lower noise.

Also, recently, an example of the study of a linear type vibration wave motor using straight beams is known (Collected Lectures in Japan Acoustics Society, March 1984, p.603), and the details thereof are omitted herein, but the applicability of the present invention to such a vibration wave motor will hereinafter be described with reference to FIGS. 9A and 9B.

Figure 9A:
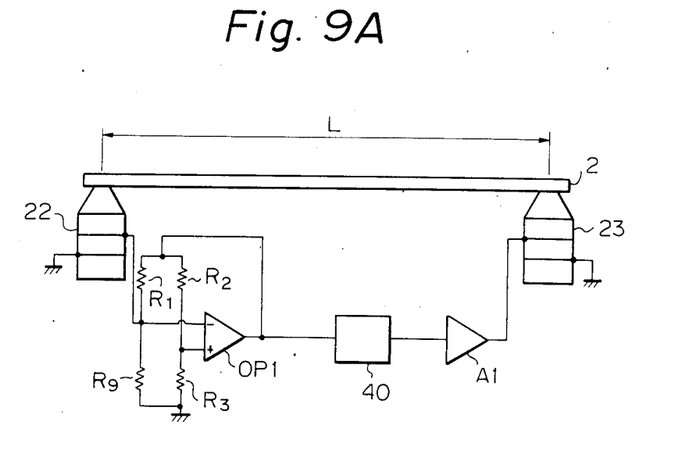
FIG. 9 is a circuit diagram of an embodiment in which the present invention is applied to a linear type vibration wave motor.
Figure 9B:
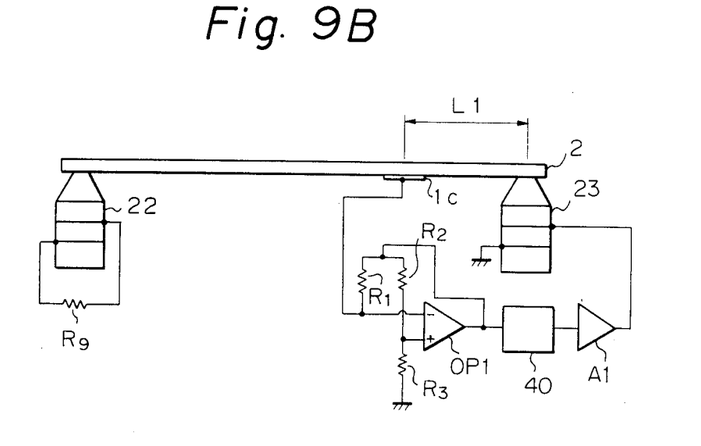

In FIGS. 9A and 9B, reference numeral 2 designates a vibratory plate, reference numeral 22 denotes a vibration absorbing vibrator, reference numeral 23 designates an exciting vibrator having an electrostrictive element (not shown), R9 denotes a vibration energy absorbing resistor, L is the distance between the vibrators 22 and 23, and L1 is the distance from the vibrator 23 to a vibration detecting electrostrictive element 1c. Reference numeral 40 designates a phase shifter functionally similar to the phase shifter 15 shown in the first embodiment. In the case of FIGS. 9A and 9B, a frequency signal is applied to the unshown electrostrictive element of the exciting vibrator 23 by an amplifier A1 to generate the vibration of the vibratory plate 2 and the vibration absorbing vibrator 22 is used to prevent the reflection of the other end, whereby a travelling vibration wave is generated in the vibratory plate 2. In FIG. 9A, an oscillating operational amplifier OP1 is directly connected to the vibration absorbing vibrator, whereafter it is connected to the amplifier A1 through the 90° phase-shifter 40. In FIG. 9B, a vibration detecting electrostrictive element is provided on the vibratory plate 2, whereafter the output thereof is input to the amplifier A1 through a 90° phase-shifter 1. The distances L and L1 satisfy $L = m \cdot \lambda/2$ and $L1 = m_1 \cdot \lambda/2$, respectively, whereby oscillation can take place. In the equations above, m and $m_1$ are integers and $\lambda$ is the wavelength of a bent wave. If the amount of phase shift of the phase-shifter 40 is changed in conformity with the position, it will not be necessary to restrict the position.

As described above, the phase shifter is used and the shape and size of the vibration detecting element are taken into consideration, whereby vibration of high driving efficiency can be imparted to the vibratory member.

We claim:

1. A driving circuit for a vibration wave driving body in which a travelling vibration wave is generated in a vibration member having at least a pair of electro-mechanical energy converting element groups arranged or polarized in the fashion of a phase difference by applying a periodic signal to said electro-mechanical energy converting elements while endowing the periodic signal with a phase difference and said vibration member and a contact member contacing it are moved relative to each other by said travelling vibration wave, said driving circuit comprising:

(a) detecting means for detecting a vibration corresponding to the vibration wave of said vibration member, said detecting means being disposed at a position on said vibratory member except for said electromechanical converting elements to which said periodic signal is applied;

(b) an oscillator putting out said periodic signal at a frequency corresponding to an output signal put out from said detecting means;

(c) phase shifting means for shifting the phase of the output signal put out from said detecting means by a predetermined amount so as to be a phase which is in a predetermined relation to the phase of said periodic signal put out from said oscillator; and (d) application means for applying said periodic signal to said electro-mechanical energy converting element groups while endowing said periodic signal with a phase difference.

2. A driving circuit according to claim 1, wherein said detecting means is an element generating electricity by a variation in vibration.

3. A driving circuit according to claim 1, wherein said amount of phase shift is varied by the position of said detecting means on said vibratory member.

4. A driving circuit according to claim 1, wherein said amount of phase shift is varied by the direction in which said travelling vibration wave travels.

5. A driving circuit according to claim 1, wherein said detecting means is disposed at such a position that said amount of phase shift is constant even if the direction in which said travelling vibration wave travels changes.

6. A driving circuit for a vibration wave driving body in which a travelling vibration wave is generated in a vibration member having at least a pair of electro-mechanical energy converting element groups arranged or polarized in the fashion of a phase difference by applying a periodic signals which have the periodic signal with a phase difference to said electro-mechanical energy converting elements and said vibration member and a contact member contacting it are moved relative to each other by said travelling vibration wave, said driving circuit comprising:

(a) detecting means for detecting a vibration corresponding to the vibration wave of said vibration member;

(b) phase shifting means for shifting the phase of the output signal put out from said detecting means by a predetermined amount so as to be a phase which is in a predetermined relation to the phase of said periodic signal put out from said oscillator; and (c) a control circuit for controlling said periodic signal on the basis of an output signal put out from said phase shifting means.

7. A driving circuit according to claim 6, wherein said detecting means is an element generating electricity by a variation in vibration.

8. A driving circuit according to claim 6, wherein said detecting means is on said vibration member.

9. A driving circuit according to claim 6, wherein said amount of phase shift is varied by the position of said detecting means on said vibratory member.

10. A driving circuit according to claim 6, wherein said amount of phase shift is varied by the direction in which said travelling vibration wave travels.

11. A driving circuit according to claim 6, wherein said detecting means is disposed at such a position that said amount of phase shift is constant even if the direction in which said travelling vibration wave travels changes.

* * * * *

UNITED STATES PATENT AND TRADEMARK OFFICE
CERTIFICATE OF CORRECTION

PATENT NO. : 4,692,649

DATED : September 8, 1987

INVENTOR(S) : Kazuhiro Izukawa, et al.

It is certified that error appears in the above-identified patent and that said Letters Patent is hereby corrected as shown below:

COLUMN 1

Line 38, "detecitng" should read --detecting--.

COLUMN 2

Line 64, "sign" should read --polarity sign--.
Line 65, "teh" should read --the--.

COLUMN 4

Line 52, "promises and" should read --polarity sign as--.
Line 59, "suffixed" should read --suffixes--.

COLUMN 5

Line 36, "$V_0.$ sin" should read --$V_0'$ sin--.
Line 37, "$V_0.$ sin" should read --$V_0'$ sin--.

COLUMN 6

Line 60, "just in" should read --in just--.

UNITED STATES PATENT AND TRADEMARK OFFICE
CERTIFICATE OF CORRECTION

PATENT NO. : 4,692,649

DATED : September 8, 1987

INVENTOR(S) : Kazuhiro Izukawa, et al.

It is certified that error appears in the above-identified patent and that said Letters Patent is hereby corrected as shown below:

COLUMN 8

Line 7, "embodimemt" should read --embodiment--.
    Line 8, "dirving" should read --driving--.

COLUMN 9

Line 46, "circumferentical" should read --circumferential--.
    Line 64, "2." should read --2).--.

COLUMN 11

Line 26, delete "a".

Signed and Sealed this

Second Day of February, 1988

Attest:

DONALD J. QUIGG

Attesting Officer      Commissioner of Patents and Trademarks